F. W. OFELDT.
Carbureter.

No. 211,176.  Patented Jan. 7, 1879.

Witnesses:
H. Rydquist
C. F. Gullberg

Inventor:
Frank W. Ofeldt
per A. W. Almquist
Attorney.

UNITED STATES PATENT OFFICE.

FRANK W. OFELDT, OF NEWARK, NEW JERSEY.

IMPROVEMENT IN CARBURETERS.

Specification forming part of Letters Patent No. 211,176, dated January 7, 1879; application filed October 14, 1878.

*To all whom it may concern:*

Be it known that I, FRANK W. OFELDT, of Newark, in the county of Essex and State of New Jersey, have invented a new and useful Improvement in Gas-Carbureters, of which the following is a specification:

My invention relates to apparatus for increasing the illuminating power of ordinary coal-gas by the addition of a volatilized hydrocarbon.

The invention consists in the combination, with a hydrocarbon-receiver having supply-pipe and vent-opening and inlet and outlet pipes for the gas, of a floating carbureter having an oil-chamber supplied by bottom pipes to the plane of displacement, and an influx-chamber leading the gas by a series of pipes or suitable apertures to and into the liquid-surface of the oil-chamber, whence, charged with the vaporized hydrocarbon, it expands into the receiver and passes off through the outlet-pipe.

It also consists in the construction and combination of the various parts, as will be hereinafter described and claimed.

Figure 1:
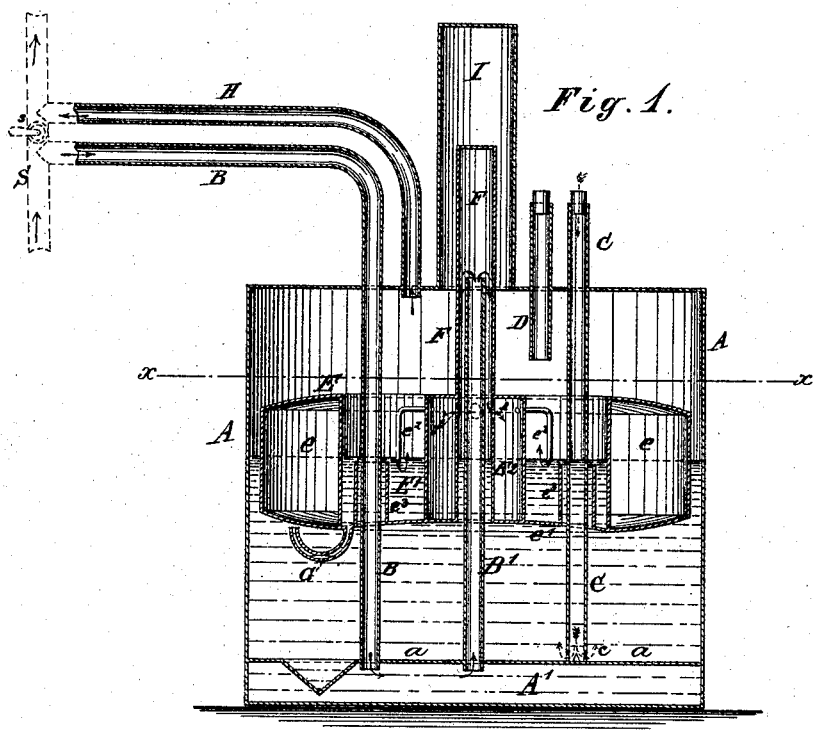
Figure 2:
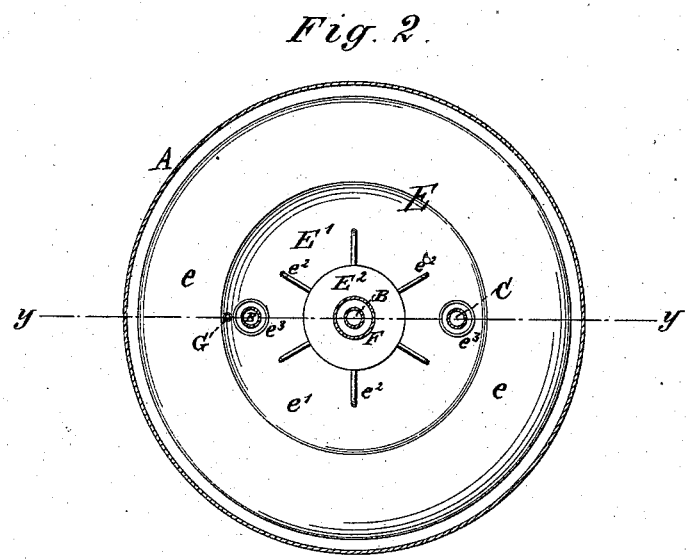

In the accompanying drawing, Figure 1 represents a vertical central section of my improved gas-carbureter, the section being taken on the line $y\,y$ of Fig. 2. Fig. 2 is a horizontal section of the same, taken on the line $x\,x$ of Fig. 1.

Similar letters of reference indicate corresponding parts.

In gas-carbureters, as heretofore constructed, absorbent materials, such as sponge, cotton, wicks, pumice-stone, coal-dust, charcoal, and other substances, have been used to supply and distribute the hydrocarbon oil by capillary attraction, and thus at the same time afford an increased surface for evaporation, instances of which are shown in Patent No. 73,073, dated January 7, 1868, and in Patent No. 182,345, dated September 19, 1876, and others; but they consequently also absorb the condensed water-vapor of the coal-gas, and thus filled with water become inoperative. When in working order they cause too much vaporization of gasoline before the coal-gas comes in contact with it, and thus the quality of the gas becomes very irregular. In others, as in Patent No. 162,543, dated April 27, 1875, where the gas passes into the oil underneath a float, and thence from chamber to chamber in said float before being discharged, the velocity of the gas is impeded by too much resistance.

My invention has for its object to overcome these difficulties.

A is the oil-tank or hydrocarbon-receiver, divided by the partition $a$ near its bottom, so as to form a lower chamber or water-trap, $A'$, into which the coal-gas from the supply-pipe S (shown in dotted lines) enters through the pipe B, (which runs vertically through the tank,) and condenses the main portion of its water-vapor, after which it passes through the vertical central pipe, $B'$, to the influx-chamber of the floating carbureter.

The tank A is supplied with gasoline through the pipe C, which for this purpose has openings $c$ at its lower end just above the partition $a$.

D is a vent-pipe for the escape of vapor while pouring in the oil, and descends deep enough to indicate, by the spurting of the oil when the latter has reached the lower end of it, that the receiver is filled to the proper height.

The carbureter proper is a floating cylindrical tank or other vessel, E, consisting of a circumferential closed chamber, $e$, to give it buoyancy; an oil-chamber, $E^1$, open at the top, and formed by the inner wall of the chamber $e$, and by the concave bottom $e^1$; and of a central annular closed drum or chamber, $E^2$, surrounding the central pipe, F, which latter is closed at its upper end, and in its turn surrounds the pipe $B'$, and is sufficiently larger than the said pipe $B'$ to form a space around it for the free flow of the coal-gas to and through the apertures $f$ into the drum $E^2$. A series of small downward-bent pipes, $e^2$, lead from the drum $E^2$ to the surface of the liquid in the chamber $E^1$, being made of suitable length to just touch the plane of displacement when the carbureting-float E is poised. The oil from the tank A enters the oil-chamber $E^1$ of the carbureter E through the curved bottom pipe, G, and through the vertical bottom pipes, $e^3$, which latter reach up to a little below the plane of displacement and surround loosely the pipes B and C, so that the vessel E may rise and fall freely with the liquid-surface in the tank A, and all feed-valves are dispensed with.

H is the pipe which returns the gas, carbureted, to the supply-pipe S of the building.

The gas-space of the tank A is extended by a tube, I, (closed at the upper end,) which forms a dome over the central opening in the tank-cover, into which the pipe F must pass as the carbureter E rises.

When the stop-cock $s$ in the supply-pipe S is closed, as shown in Fig. 1, the coal-gas passes through the pipe B, trap A', and pipe B' into the influx-chamber F $E^2$, and thence through the pipes $e^2$ into the gasoline just below its surface, which is thus vaporized by the coal-gas in volumes proportionate to the passing volumes of the latter. The carbureted coal-gas, rising from the oil-surface into the space above the carbureter E, returns through the pipe H to the supply-pipe S of the building.

Water from the coal-gas condensing in the oil-chamber $E^1$ gradually trickles out through the curved pipe G and sinks to the bottom $a$, from whence it may be pumped out at intervals through the pipe C. The water-trap A' may be emptied automatically through a curved pipe onto the ground or pumped out through a pipe leading from the trap A'. If ever desired, the chamber $E^1$ is similarly accessible to cleaning through the vent-pipe D.

Having thus described my invention, I claim as new and desire to secure by Letters Patent—

1. The combination, with the tank A, provided with the supply-pipe C, vent D, and gas-pipes B B' H, of the floating carbureter E, having an oil-chamber, $E^1$, supplied through bottom pipes or apertures, G $e^3$, and an influx chamber or chambers, F $E^2$, provided with pipes or apertures $e^2$, discharging just below the surface of the liquid hydrocarbon, substantially as and for the purpose set forth.

2. The combination of the floating carbureter E, having the bottom siphon, G, with the tank A, provided with bottom trap, A', and inlet pipes B B', opening into said trap, for the purpose of disposing of the water from the gas, substantially as specified.

FRANK W. OFELDT.

Witnesses:
 H. RYDQUIST,
 A. W. ALMQVIST.